J. W. DAWSON.
VALVE STEM LUBRICATING SHIELD.
APPLICATION FILED NOV. 22, 1917.
1,293,607.
Patented Feb. 4, 1919.
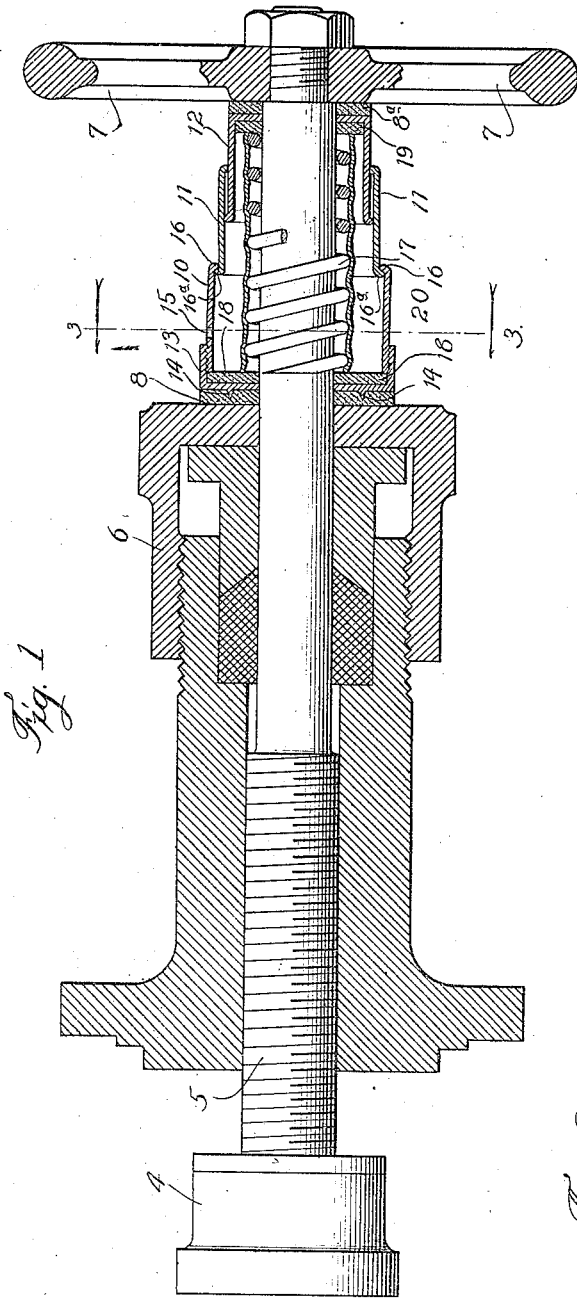
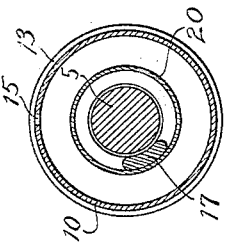
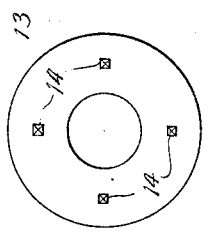
Witnesses:
M Sullivan
Irwin C. Bowman
Inventor:
James W. Dawson,
By Dyrenforth, Lee, Chritton and Wiles,
Att'ys

UNITED STATES PATENT OFFICE.

JAMES W. DAWSON, OF CHICAGO, ILLINOIS.

VALVE-STEM-LUBRICATING SHIELD.

1,293,607.   Specification of Letters Patent.   Patented Feb. 4, 1919.

Application filed November 22, 1917. Serial No. 203,381.

*To all whom it may concern:*

Be it known that I, JAMES W. DAWSON, a citizen of the United States, residing at Chicago, in the county of Cook and State of Illinois, have invented a new and useful Improvement in Valve-Stem-Lubricating Shields, of which the following is a specification.

The stems of valves used for controlling fluids which tend to attack metal, soon become mutilated or pitted by the action of such fluids because of lack of or imperfect lubrication to protect the stems. The resultant mutilation, in working the stems to open and close the valves, cuts and wears the packing in the stuffing boxes. The refrigerant, such as anhydrous ammonia, used in ice and refrigerating machines is thus injurious to the stems of the valves used, for example, on the condensers, where repair or replacement is attended with peculiar difficulties; and I have more especially devised my present improvement for use in that particular connection and in analogous connections, as a device of simple and comparatively inexpensive construction for preventing such impairment of valve-stems.

In the accompanying drawing, Figure 1 is a view in longitudinal section showing a valve-stem equipped with my improvement; Fig. 2 is a view in elevation of a cap-member of the telescopic shield, and Fig. 3 is a section on line 3—3, Fig. 1.

As shown, the valve 4 on a threaded stem 5 working in a sleeve provided with a stuffing-box 6 and carrying a handle shown as a hand-wheel 7, forms a valve-device of ordinary construction employed on refrigerating machines of the type hereinbefore referred to. It is also common practice to provide a flexible washer 8, of felt or other suitable material, about the stem adjacent to the stuffing-box.

A shield 9, formed of a plurality of telescoping tubular sections of which three are shown at 10, 11 and 12, respectively, though they may be two or more in number, is confined about the valve-stem between the stuffing-box and the hand wheel. These sections are preferably of hard rubber, though they may be formed of any suitable material. The section 10 is shown with a cap 13 screwed upon its inner end and provided on its face with points 14 to penetrate the washer 8 and tend to prevent rotation of the section, thereby to maintain uppermost a hole 15 in the latter, through which to supply lubricant to the interior of the shield. The outer end of the section 10 is formed with an inwardly extending flange 16 to be engaged by an outwardly extending flange 16ª about the adjacent end of the section 11, which is flanged at its outer end, like the section 10, to be engaged by a flange on the adjacent end of the section 12 like that provided on the section 11 for engaging the flange 16. Thus the shield may be telescopically contracted by turning the stem 5 to seat the valve 4, and is free to be distended, by unseating the valve; and the flanges on the sections prevent them from being separated by elongation of the shield.

A helical spring 17 surrounds the valve-stem section housed by the shield and is confined between a flexible washer 18 about the stem, pressed by the spring against the cap 13, and a similar washer 19 about the stem, which the spring presses against the inwardly flanged or headed outer end of the shield-section 12. A similar washer 8ª is shown to be provided about the stem between the hand-wheel and adjacent end of the section 12 to coöperate with the washer 19, as does the washer 18 with the washer 8, in preventing leakage about the valve-stem. A layer 20, of muslin or other suitable material, is wrapped around the spring to absorb and hold lubricant for keeping the outer section of the valve-stem coated therewith and thus protect against attack and resultant mutilation by the fluid which the valve controls, and which may leak past the valve through the stuffing-box.

As will be seen, the spring tends to keep the telescoping shield resiliently distended by pressing its end-sections respectively against the stuffing-box and the hand-wheel, thereby tightening the washers about the valve-stem section whatever the length may be of the latter protruding beyond the stuffing-box in the different positions to which the valve may be adjusted.

I realize that considerable variation is possible in the details of construction thus specifically shown and described, and I do not intend by illustrating a single specific or preferred embodiment of my invention to be limited thereto; my intention being in the following claims to claim protection upon all there may be of novelty in my invention as broadly as the state of the art will warrant.

I claim:

1. A valve-stem lubricating shield confinedly fitting about the stem between its stuffing-box and operating handle, and comprising a plurality of telescoping tubular sections having washers in the shield-ends, and a spring housedly confined between said washers in and tending to distend the shield against said stuffing-box and handle.

2. A valve-stem lubricating shield confinedly fitting about the stem between its stuffing-box and operating handle, and comprising a plurality of telescoping tubular sections having washers in the shield-ends, a helical spring housedly confined between said washers to surround the stem in and tend to distend the shield against said stuffing-box and handle, and flexible lubricant-absorbing material about the shielded spring.

3. A valve-stem lubricating shield confinedly fitting about the stem between its stuffing-box and operating handle, and comprising a plurality of telescoping tubular sections, a helical spring confined endwise between the end-sections to surround the stem and tend to distend the shield against said stuffing-box and handle, and flexible lubricant-absorbing material about the shielded spring.

4. A valve-stem lubricating shield confinedly fitting about the stem between its stuffing-box and operating handle, and comprising a plurality of telescoping tubular sections, the inner section having a lubricant-supply opening and a cap on its inner end provided with points on its outer face, and a helical spring confined between the end-sections to surround the stem and tend to distend the shield against said stuffing-box and handle.

5. In combination with a valve-stem working through a stuffing-box and having an operating handle on its outer end, washers on the stem respectively adjacent said stuffing-box and handle, a shield comprising a plurality of tubular sections confined about the stem between said washers and containing washers in its end-sections, the innermost shield-section having a lubricant-supply opening and a cap on its inner end provided with points penetrating said washer adjacent the stuffing-box, a helical spring housedly confined about the stem between said washers within the shield to tend to distend the latter, and flexible lubricant-absorbing material in the shield about the spring.

JAMES W. DAWSON.